US009768576B2

(12) United States Patent
Sook et al.

(10) Patent No.: US 9,768,576 B2
(45) Date of Patent: Sep. 19, 2017

(54) SHOTGUN STICK WITH REMOTE CONTROLLER

(71) Applicant: Dominion Resources, Inc., Richmond, VA (US)

(72) Inventors: Timothy R. Sook, Portsmouth, VA (US); Stephen Callendar, Richmond, VA (US); Eleanor Holliday, Richmond, VA (US); Tucker Matthews, Richmond, VA (US); Trey Newell, Richmond, VA (US); Victoria Spott, Richmond, VA (US); Kyle Vernon, Richmond, VA (US)

(73) Assignee: Dominion Energy, Inc., Richmond, VA (US)

( * ) Notice: Subject to any disclaimer, the term of this patent is extended or adjusted under 35 U.S.C. 154(b) by 1 day.

(21) Appl. No.: 14/662,309

(22) Filed: Mar. 19, 2015

(65) Prior Publication Data

US 2015/0270674 A1 Sep. 24, 2015

Related U.S. Application Data

(60) Provisional application No. 61/968,063, filed on Mar. 20, 2014.

(51) Int. Cl.
*H02G 1/02* (2006.01)
*B25J 1/04* (2006.01)
*H01R 43/26* (2006.01)
*H01R 11/14* (2006.01)

(52) U.S. Cl.
CPC ............. *H01R 43/26* (2013.01); *B25J 1/04* (2013.01); *H01R 11/14* (2013.01); *H02G 1/02* (2013.01); *Y10T 29/53213* (2015.01)

(58) Field of Classification Search
CPC .............. H02G 1/02; H01R 11/14; B25J 1/04
See application file for complete search history.

(56) References Cited

U.S. PATENT DOCUMENTS

| 3,666,311 | A | | 5/1972 | McMullin |
| 3,788,691 | A | | 1/1974 | McMullin |
| 3,916,701 | A | * | 11/1975 | Butler ..................... B25J 18/04 |
| | | | | 414/728 |
| 4,853,592 | A | | 8/1989 | Strathman |
| 5,096,438 | A | | 3/1992 | Black |

(Continued)

*Primary Examiner* — Gerald McClain
(74) *Attorney, Agent, or Firm* — Blank Rome LLP

(57) ABSTRACT

An apparatus and method is provided for a shotgun stick for manipulating, removing and installing clamps and other devices to electrical connectors on electric power distribution systems. The shotgun stick includes an elongated, electrical insulating, support rod having a working end and a holding end. An electrical insulating head mounted on the working end of the support rod. A clamping mechanism is mounted within the head for extension from the head and retraction into the head. An actuating mechanism is mounted within the head for extending and retracting the clamping mechanism. A control module is mounted within the head for controlling the actuating mechanism to extend and retract the clamping mechanism. The control module including a receiver for receiving a control signal. A remote controller is operable by the operator holding the holding end to generate the control signal.

26 Claims, 20 Drawing Sheets

(56) References Cited

U.S. PATENT DOCUMENTS

| | | | |
|---|---|---|---|
| 5,113,274 A | 5/1992 | Takahashi et al. | |
| 5,593,196 A | 1/1997 | Baum et al. | |
| 5,787,536 A | 8/1998 | Pate | |
| 6,739,220 B1 | 5/2004 | Johnson et al. | |
| 7,156,354 B2 | 1/2007 | Shepherd et al. | |
| 7,255,024 B2 * | 8/2007 | Johnson | H01K 3/32 81/53.1 |
| 8,469,423 B1 | 6/2013 | Crowley, Jr. et al. | |
| 8,763,973 B2 * | 7/2014 | Musselman | H02G 1/02 182/2.11 |
| 9,362,028 B2 * | 6/2016 | Behnken | H01B 17/00 |
| 9,573,266 B2 * | 2/2017 | Huang | B25J 1/04 |
| 2005/0156092 A1 | 7/2005 | Shepherd et al. | |
| 2005/0232132 A1 | 10/2005 | Ashdown et al. | |
| 2006/0055642 A1 | 3/2006 | Daughenbaugh et al. | |
| 2008/0250570 A1 | 10/2008 | Dayton et al. | |
| 2011/0101716 A1 | 5/2011 | Nolte et al. | |
| 2012/0284997 A1 | 11/2012 | Morin et al. | |
| 2013/0284869 A1 * | 10/2013 | Helenius | H02G 1/02 248/218.4 |
| 2014/0102739 A1 | 4/2014 | Tamm | |
| 2015/0027261 A1 * | 1/2015 | Okahisa | B25J 18/04 74/490.02 |

\* cited by examiner

☐ NUT
☐ FIXED COVER
☐ SLIDING TUBE

SHOTGUN STICK WITH REMOTE CONTROLLER

This application claims priority under 35 U.S.C. §119(e) to U.S. provisional patent application 61/968,063 filed on Mar. 20, 2014, which is hereby incorporated by reference in its entirety herein.

BACKGROUND

Described embodiments relate generally to an apparatus, commonly referred to as a shotgun stick, for manipulating and installing clamps and other devices to electrical connectors, and more particularly to a shotgun stick for use at extended distances from the electrical connectors.

Linemen working on electric power distribution systems often have to manipulate, remove and install clamps and other devices to electrical connectors. To perform these tasks, a lineman may use apparatus, commonly referred to as hot sticks, designed to electrically insulate the potentially energized electrical connector from the lineman, and to provide structure for manipulating the clamps. Hot sticks are commonly made from materials, for example wood or fiberglass, that do not conduct electricity along their lengths sufficient to cause harm to a workman when the sticks are energized at substantial voltages, such as fifty thousand to one hundred thousand volts.

It may be difficult for the lineman to get close to the electrical connector for performing tasks. For example, the electrical connectors may be electric power lines, or may be located at electric power lines, mounted high in the air, for example on poles or on the sides of buildings. Lift platforms or buckets, mounted on trucks, are used to elevate and position the lineman closer to the connector. However, environmental or other conditions may restrict or prevent positioning the truck, or the bucket, for the lineman to work close to the connector. The restrictive conditions may include, for example, soft or steep terrain, or the presence of trees or vines. In some instances, the lineman may be required to climb the utility pole to access the lines or devices. Accordingly, the hot sticks come in various lengths, or are designed to have adjustable lengths, to allow the lineman to manipulate the clamps or other devices from a distance, for example from a bucket lift, from the utility pole, or from the ground.

Certain tasks performed with hot sticks require that the clamp or other device be grasped firmly, to secure it and give the lineman control over it. Examples of those tasks include: changing out k-mates and fuses; isolating jumpers; and installing and removing arresters, risers, fault indicators and bird guards. Those tasks may typically be performed with a kind of hot stick commonly referred to as a shotgun stick, clamp stick or grip-all stick. Shotgun sticks include clamping mechanisms operated by the lineman to firmly grasp the clamp and other devices. Examples of shotgun sticks are described in U.S. Pat. Nos. 3,666,311 and 3,788,691, and 5,096,438. Shotgun sticks typically come in fixed or adjustable lengths of about six feet to about eight feet. FIG. 20 shows a known fixed length shotgun stick, for example a standalone, manual shotgun stick.

Shotgun sticks are typically used while the lineman is standing in the truck lift, and sometimes when the lineman is on the pole. Shotgun sticks are typically not used from the ground to perform tasks at elevated locations, which may be up to fifty feet or more above the ground level. Sticks that long may experience significant bowing over their lengths, caused by the weight of the stick itself and of the grasping mechanism at the stick's working end. The bowing inhibits the required mechanical operation of the grasping mechanism by the lineman, which operation is typically effected by an actuating rod extending along the length of the stick. Making the hot stick stiffer to decrease the bowing over such extended lengths, adds more weight to the stick, making it impractical to lift and maneuver by the lineman.

Other tasks do not require firm grasping of the clamp or other device. Examples of those tasks include opening and closing cutout doors for housings for fuses for mainline or transformers. Those tasks may be performed with shotgun sticks, or they may be performed with other hot sticks that do not have a clamping mechanism for grasping the device, but, rather, may have a fixed hook or other working end configuration, for example for engaging cutout door handles. Those hot sticks may include a working end attachment attached to a hot stick support rod, or pole. The support rod may have a fixed length or may be adjustable. FIG. 23 shows a known fixed-length hot stick pole with no working end attachment. FIG. 16 shows a known un-extended telescoping pole 1600 with a working end attached. FIG. 18 shows example known hot stick working end attachments and connector mount configuration, including a tree trimmer 1810, a standard switch head disconnect 1820, a non-metallic disconnect 1830, and a plastic universal mount configuration 1840. Some known adjustable hot stick support rods are commonly referred to or available as pogo sticks, tel-o-poles, or extendo sticks, and may extend to greater lengths than known shotgun sticks. Extendo sticks may typically telescope to lengths up to forty-five to fifty-five feet, and are typically used while the lineman is standing on the ground.

When there is a power failure, customers lose electrical service and a first responder lineman may be dispatched to identify the cause of the failure. If the first responder lineman can fix the problem, the customer power may be restored quickly. Sometimes, the first responder lineman cannot fix the problem because the failed equipment is out of reach of the lineman and of his tools, for example a shotgun stick. Thus, other workmen and/or a bucket truck may be required before the lineman may reach the failed equipment, using a bucket truck or by climbing a pole. For inaccessible poles, it may be necessary to take more difficult measures, such as using mats or "winching" a truck in, to get a truck close enough to the pole to perform the tasks, which measures increase the risk of injury and increase outage and cost, particularly in afterhours situations.

Accordingly, there is a desire for devices and methods that provide a shotgun stick for performing tasks at extended distances without having to climb poles or use a bucket.

SUMMARY

The described embodiments alleviate the problems of the prior devices and methods by providing a shotgun stick for use by an operator for manipulating, removing and installing clamps and other devices to electrical connectors on electric power distribution systems, the shotgun stick including: an elongated, electrical insulating, support rod having a working end and a holding end, and having a length between the working end and the holding end; an electrical insulating head mounted on the working end of the support rod; a clamping mechanism mounted within the head for extension from the head and retraction into the head; an actuating mechanism mounted within the head for extending and retracting the clamping mechanism; a control module mounted within the head for controlling the actuating mechanism to extend and retract the clamping mechanism, the control module including a receiver for receiving a control signal; and a remote controller, operable by the operator holding the holding end to generate the control signal.

In one aspect, the clamping mechanism is mounted to slide axially within the head for extension from the head and retraction into the head.

In another aspect, the actuating mechanism engages the clamping mechanism to push the clamping mechanism to slide it axially within the head for extension from the head, and to pull the clamping mechanism to slide it axially within the head for retraction into the head.

In another aspect, the actuating mechanism includes a motor mounted axially within the head and having an exterior stator and an interior rotor, the rotor having a threaded inner bore, and a threaded lead screw extending through the rotor inner bore, the rotor inner bore threads directly or indirectly engaging the lead screw threads to move the lead screw axially upon rotation of the rotor, the lead screw engaging the clamping mechanism to slide it axially within the head.

In another aspect, the control signal is wireless, for example acoustic or electromagnetic, including radio frequency waves or visual frequency waves.

In another aspect, the shotgun stick includes a battery mounted within the head, the battery powering the motor and the control module.

In another aspect, the shotgun stick includes a rotation mechanism for rotating the head.

In another aspect, the actuating mechanism includes a motor mounted within the head, the motor driving a gear, the gear engaging a toothed lead screw to move the lead screw axially upon operation of the rotor, the lead screw engaging the clamping mechanism to slide it axially within the head.

In another aspect, the shotgun stick includes a light and/or a camera mounted within the head for lighting and/or viewing in the direction of the clamping mechanism.

In another aspect, the clamping mechanism includes a pivoting hook that is mounted to pivot to form an open hook with the clamping mechanism extended fully from the head at an open position, to form a closed loop with the clamping mechanism partially retracted into the head at a closed position, and to clamping the device with the clamping mechanism partially retracted into the head at a clamping position.

In another aspect, the remote controller includes controls operable by the operator for generating signals to selectively extend the hook and to retract the hook, to selectively rotate the head clockwise and counter clockwise, to selectively operate a light, and to selectively operate a camera.

In another aspect, the remote controller includes a screen for viewing an image generated by the camera.

In another aspect, there is provided a method of manipulating, removing and installing clamps and other devices to electrical connectors on electric power distribution systems, including the steps of: providing a shotgun stick for use by an operator, including: an elongated, electrical insulating, support rod having a working end and a holding end, and having a length between the working end and the holding end; an electrical insulating head mounted on the working end of the support rod; a clamping mechanism mounted within the head for extension from the head and retraction into the head; an actuating mechanism mounted within the head for extending and retracting the clamping mechanism; a control module mounted within the head for controlling the actuating mechanism to extend and retract the clamping mechanism, the control module including a receiver for receiving a control signal; and a remote controller, operable by the operator holding the holding end to generate the control signal; operating the remote controller to extend the clamp mechanism; engaging the device with the clamp mechanism; operating the remote controller to retract and close the clamp mechanism on the device; and manipulating the engaged device.

A fuller understanding of the disclosure may be had by referring to the following description and claims taken in conjunction with the accompanying drawings.

DETAILED DESCRIPTION

Figure 1:
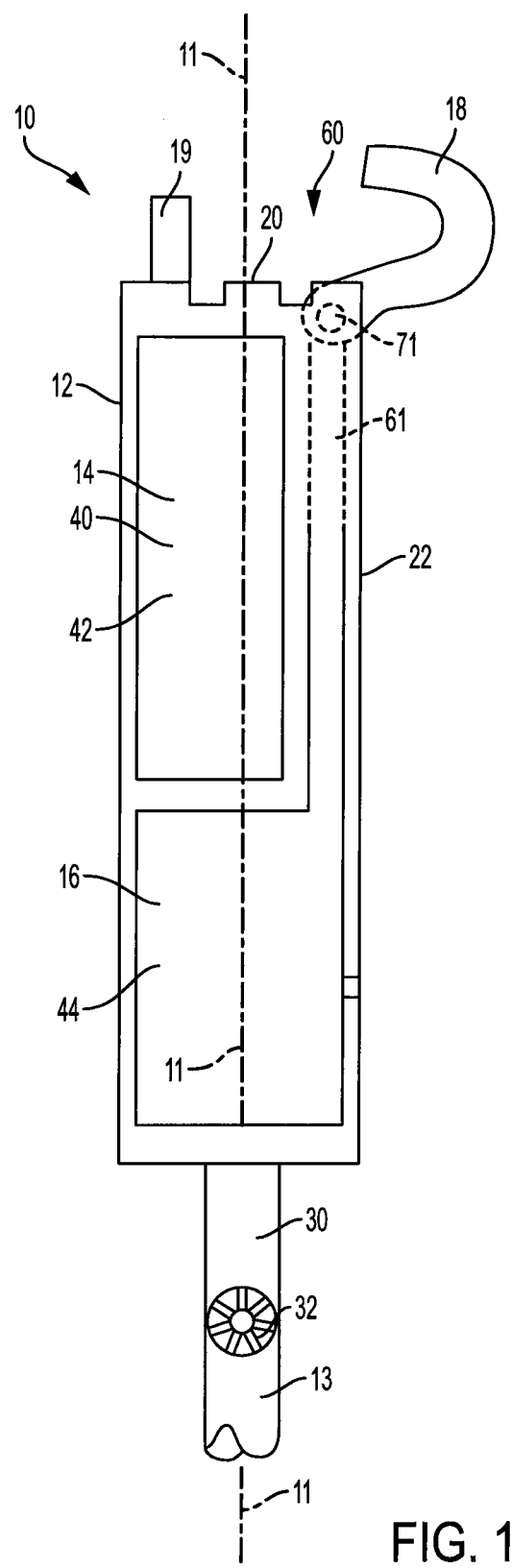
FIG. 1 is schematic of a shotgun stick head, in accordance with embodiments described herein.

The disclosure is directed to an apparatus and method is provided for a shotgun stick for manipulating, removing and installing clamps and other devices to electrical connectors on electric power distribution systems. The shotgun stick includes an elongated, electrical insulating, support rod having a working end and a holding end. An electrical insulating head mounted on the working end of the support rod. A clamping mechanism is mounted within the head for extension from the head and retraction into the head. An actuating mechanism is mounted within the head for extending and retracting the clamping mechanism. A control module is mounted within the head for controlling the actuating mechanism to extend and retract the clamping mechanism. The control module including a receiver for receiving a control signal. A remote controller is operable by the operator holding the holding end to generate the control signal.

The disclosure is directed to wireless remote control operation of a shotgun stick. A shotgun stick is a known tool used by lineman completing electrical work in the field. As known, shotgun sticks are approximately sixteen inches long and include an operating rod that allows for control of the hook at the end thereof. In the invention, the operating rod is actuated by a motorized actuator; and control of the motorized actuator is achieved by wireless remote operation.

In examples of the shotgun stick according to the disclosure, a motorized actuator is positioned inside the housing of the stick, the actuator is run by a DC battery and is controlled by a wireless remote control, and the shotgun stick has a universal end so that it may be attached to universal extenders (e.g., a Tel-O-Pole), however the invention is not limited to such configurations. The shotgun stick will allow lineman to perform tasks from the ground, which would normally require the lineman to climb the pole or use a bucket truck, instead. It, thus, eliminates the necessity of linemen having to climb poles to perform many simple tasks. The shot gun stick may be approximately sixteen inches long. An operating rod is controlled by an actuator inside the housing of the stick. The actuator may be run by a DC battery and is controlled by remote. The shotgun stick may have a universal end so that it may be attached to a Tel-O-Pole. The shotgun stick will allow lineman to do from the ground all activities they would normally do with a six-foot or eight-foot stick from an elevated bucket, for example in situations where the electrical line wire support poles are not accessible, or are not proximate to the work site. With the shotgun stick of the disclosure, linemen are relieved from having to climb poles to perform tasks such as lifting risers, lifting jumpers, changing BCL's (K-mates), isolating blown arrestors, isolating arrestors, changing fuses, installing and removing animal guards on equipment, installing and removing bird diverters, installing and removing fault indicators, installing and removing equipment grounds, installing and removing tagging devices, thus alleviating the problem of having to climb poles or taking more difficult measures for inaccessible poles to get a truck close enough to the pole such as using mats or "winching" a truck in, to perform the tasks, which increases the risk of injury and increases outage times. Thus the shotgun stick of the disclosure may increase safety performance and productivity including reduced outage times by eliminating climbing of poles and making call-outs for extra workers, particularly in afterhours situations.

The term "shotgun stick" may be used in the disclosure to describe the clamping head (or headstock) alone, or the head mounted on a pole. The term "shotgun stick attachment" may be used in the disclosure to describe the clamping head (or headstock) alone, particularly when detachably mounted to a pole.

Refer now to FIGS. 1, 17, 19 and 21, there being shown a shotgun stick, generally designated by reference numeral 10, according to a described embodiment. The shotgun stick 10 includes an elongated, electrical insulating, support rod 13 having a working end 15 and a holding end 17, and having a length 21 between the working end 15 and the holding end 17. The rod 13 of FIG. 17, for example showing an unextended telescoping pole with battery powered shotgun attachment 1700, has an adjustable length 21. The rod 13 of FIGS. 19 and 21 has a fixed length 21. For example, the embodiment shown in FIG. 19 may be a hot stick with battery powered shotgun stick attached.

An electrical insulating head, or headstock, 22 is mounted at the working end 15 of the support rod 13. The rod 13 and the mount 30 of the headstock 22 of FIGS. 1, 17 and 19 have universal attachment engagement surfaces 32 for connecting the headstock 22 to the rod 13, so the rod 13 may be easily removed and changed, for example from a fixed length rod to an adjustable length rod. The standalone shotgun stick 10 of FIG. 21 has a rod 13 made integral with the headstock. For example, the embodiment of FIG. 21 may be a standalone, battery powered shotgun stick.

As shown in FIG. 1, a clamping mechanism 60 is mounted within the head 22 for extension from the head and retraction into the head. An actuating mechanism 16 is mounted within the head 22 to slide axially within the head along the direction of the axis 11 for extending and retracting the clamping mechanism 60. The actuator 16 may be twelve volts DC with a six inch extension that can stop and hold in any position when power is removed. The actuating mechanism 16 engages the clamping mechanism 60, at an operating rod 61, to push the clamping mechanism to slide it axially within the head for extension from the head, and to pull the clamping mechanism to slide it axially within the head for retraction into the head.

Comparable to known shotgun hooks, the clamping mechanism 60 includes a pivoting hook 18 that is mounted to pivot at a pivot 71 to form an open hook with the clamping mechanism extended fully from the head at an open position, to pivot the end of the hook 18 to the end of the land 19 to form a closed loop with the clamping mechanism partially retracted into the head 22 at a closed position, and to clamp the device with the clamping mechanism partially retracted into the head 22 at a clamping position. In the open position a device may be engaged or disengaged by the shotgun stick 10. In the closed position or in the clamping position, the device may be turned by the shotgun stick 10, for example for tightening or loosening threaded fastening devices, for example threaded eyes. In the clamping position, the device is grasped, for example against post 20, and may be carried and positioned by the shotgun stick 10.

A control module 14 is mounted within the head 22 for controlling the actuating mechanism 16 to extend and retract the clamping mechanism 60. The control module 14 housing includes a receiver 42 for receiving a control signal, and a battery 40 for powering the control module 14, the actuator 16 motor 44, and the receiver 42. The head 22 has an electric insulating housing, for example fiberglass, with the actuator 16, 44, battery 40 and receiver 42, and other components contained inside. The electronics and control signals are chosen to work in electromagnetic fields experienced when working around electric power equipment.

A remote controller 50 is operable by the operator holding the holding end 17 to generate the control signal. The remote controller 50 includes controls operable by the operator for generating signals to selectively extend the clamping mechanism and to retract the clamping mechanism, to extend and retract the hook 18 to stop in different positions, for example, the open position, the closed position, the clamped position which may be based on the dimensions of the clamp or other device the shotgun stick is manipulating, and the fully retracted position.

The control signal is wireless, for example acoustic or electromagnetic, including radio frequency waves or visual frequency waves. A wired connection extending all the way from the remote controller to the receiver would provide an electrical conductive path that may expose the operator to undesirable electric voltage and current. The remote controller 50 includes a strap 52, which may be elastic and/or hook and loop material, for attaching the controller 50 to the support rod 13, although other attachment structure could be used.

Figure 2:
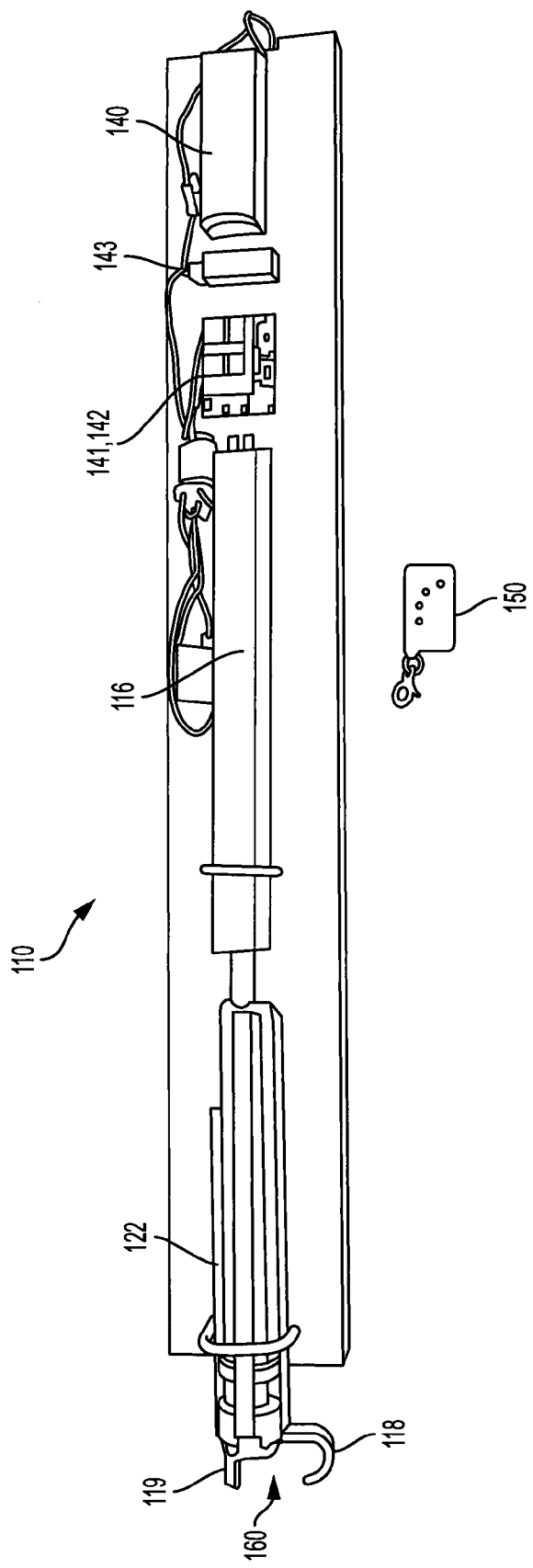
FIG. 2 is an exploded view of the components of a shotgun stick head, in accordance with embodiments described herein.

Refer now to FIG. 2, there being shown a shotgun stick, generally designated by reference numeral 110, according to a described embodiment. Some components of the stick 110 are shown laid out for viewing. A clamping mechanism 160 is mounted within the head 122 for extension from the head and retraction into the head. An actuating mechanism 116 is mounted for extending and retracting the clamping mechanism 160. The actuating mechanism 116 engages the clamping mechanism 160 to push the clamping mechanism to slide it axially within the head for extension from the head, and to pull the clamping mechanism to slide it axially within the head for retraction into the head.

Comparable to known shotgun hooks, the clamping mechanism 160 includes a pivoting hook 118 that is mounted to pivot to form an open hook with the clamping mechanism extended fully from the head at an open position, to pivot the end of hook 118 to the end of land 119 to form a closed loop with the clamping mechanism partially retracted into the head 122 at a closed position, and to clamp the device with the clamping mechanism partially retracted into the head 122 at a clamping position. In the open position a device may be engaged or disengaged by the shotgun stick 110. In the closed position, the device may be turned by the shotgun stick 110, for example for tightening or loosening threaded fastening devices. In the clamping position, the device is grasped and may be carried and positioned by the shotgun stick 110.

A controller 141 controls the actuating mechanism 116 to extend and retract the clamping mechanism 160. A receiver 142 receives a control signal, and a battery 140 powers the actuator 116 and the receiver 142. A battery level indicator 143 provides an indication of the remaining life of the battery 140, to help the lineman determine that sufficient battery power is available to complete the task. A remote controller 150 is operable by the operator to generate the control signal. The remote controller 150 includes controls operable by the operator for generating wireless signals to selectively extend the clamping mechanism and to retract the clamping mechanism.

Refer now to FIGS. 3, 4 and 24 through 27, there being shown a shotgun stick, generally designated by reference numeral 310, according to a described embodiment. The shotgun stick 310 includes an elongated, electrical insulating, support rod (not shown, but similar to rod 13 of the stick 10).

An electrical insulating head, or headstock, 322 is mounted at the working end of the support rod. The rod and the mount or universal mount 330 of the headstock 322 have a universal attachment 332 connecting the headstock 322 to the rod, so the rod may be easily removed and changed, for example from a fixed length rod to an adjustable length rod.

A clamping mechanism 360 is mounted within the head 322 for extension from the head and retraction into the head. An actuating mechanism is mounted within the head 322 to move axially within the head along the direction of the axis 311 for extending and retracting the clamping mechanism 360. The actuating mechanism 316 engages the clamping mechanism 360 to push the clamping mechanism to slide it axially within the head for extension from the head, and to pull the clamping mechanism to slide it axially within the head for retraction into the head.

Figure 3:
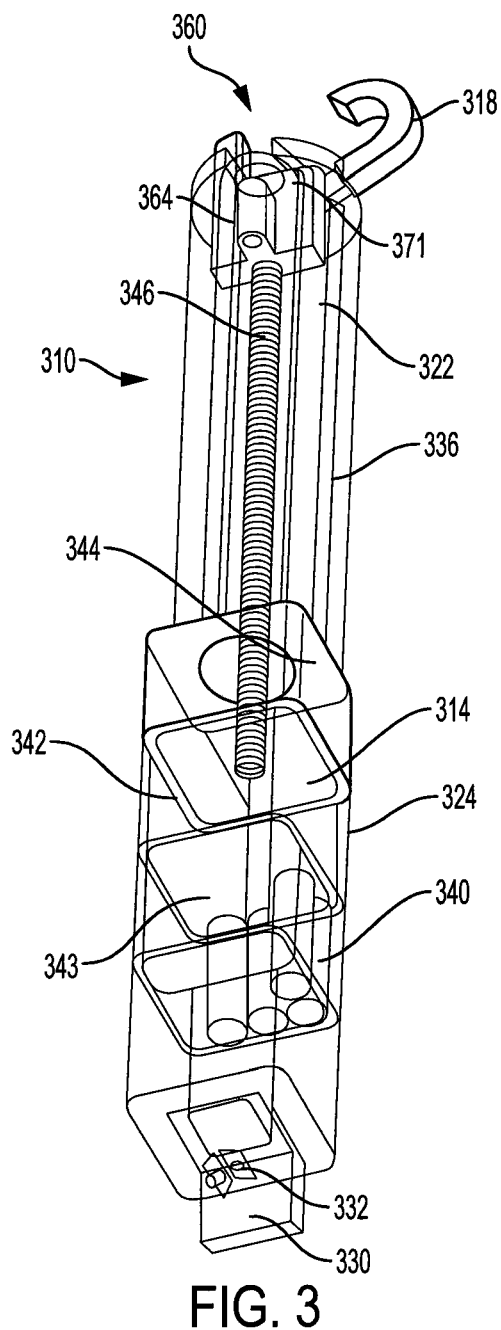
FIG. 3 is a perspective view of a shotgun stick head with the hook in an open position, in accordance with embodiments described herein.
Figure 4:
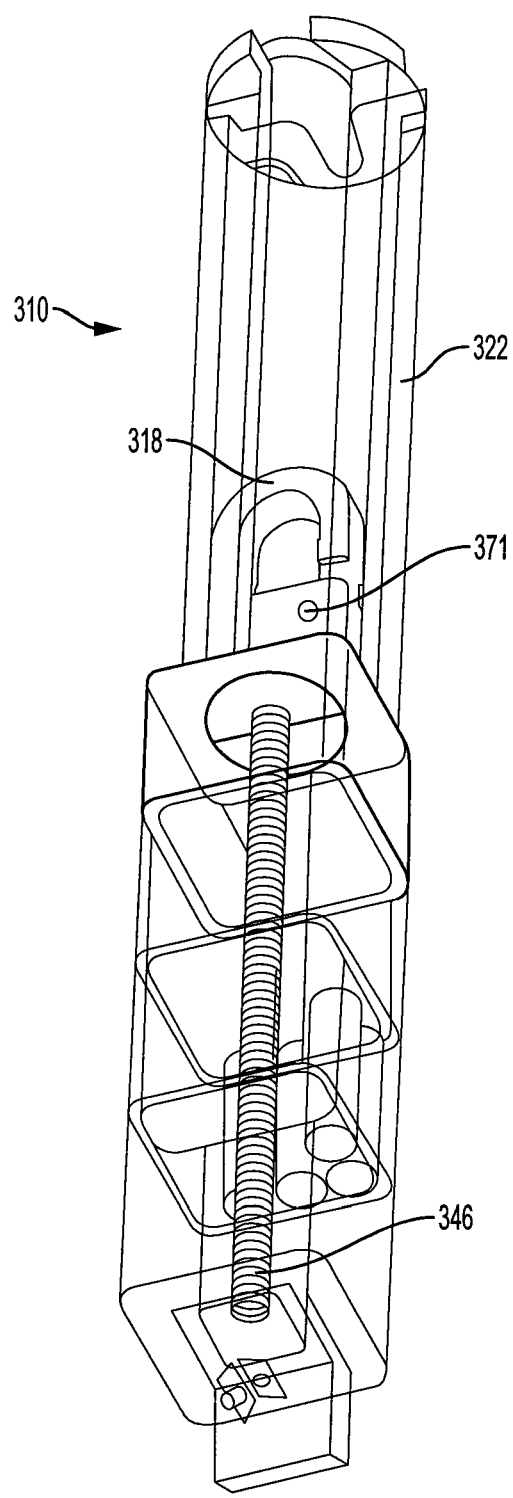
FIG. 4 is a view like FIG. 3 with the hook in a retracted position.

Comparable to known shotgun hooks, the clamping mechanism 360 includes a pivoting hook 318 that is mounted to pivot to form an open hook with the clamping mechanism extended fully from the head at an open position, to pivot the end of hook 318 to the end of land 319 to form a closed loop with the clamping mechanism partially retracted into the head 322 at a closed position, and to clamp the device with the clamping mechanism partially retracted into the head 322 at a clamping position. In the open position, as shown in FIG. 3, a device may be engaged or disengaged by the shotgun stick 310. In the closed position, the device may be turned by the shotgun stick 310, for example for tightening or loosening threaded fastening devices. In the clamping position, the device is grasped and may be carried and positioned by the shotgun stick 310. FIG. 4 shows the clamping mechanism in the fully retracted position.

The actuating mechanism 316 includes a motor or actuator motor 344 mounted axially within the head 322 and having an exterior stator and an interior rotor, the rotor having a threaded inner bore. A threaded lead screw 346 extends through the rotor inner bore. The rotor inner bore threads engage the lead screw 346 threads to move the lead screw axially upon rotation of the rotor. The lead screw 346 engages the clamping mechanism 360 to slide it axially within the head 322.

A control module 314 is mounted within the head 322 for controlling the actuating mechanism 316 to extend and retract the clamping mechanism 360. The control module 314 housing includes a receiver module or receiver 342 for receiving a control signal, and a battery or battery pack 340 for powering the control module 314, the actuator 316 motor 344, and the receiver 342. A battery level indicator 343 provides an indication of the remaining life of the battery 340. A remote controller (not shown) is operable by the operator to generate the control signal. The remote controller includes controls operable by the operator for generating wireless signals to selectively extend the clamping mechanism and to retract the clamping mechanism.

Figure 27:
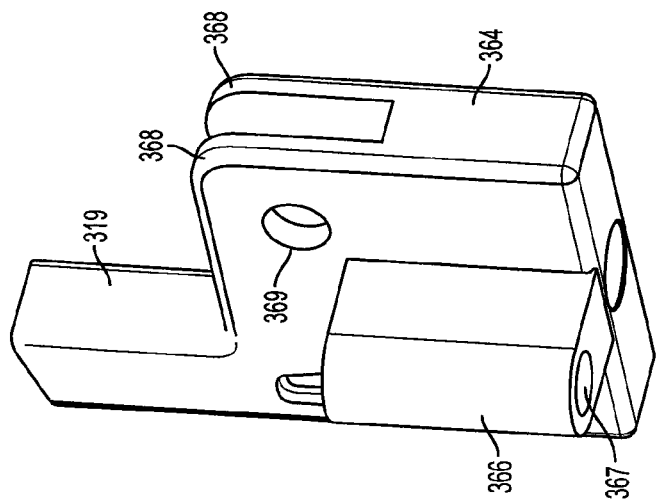
FIG. 27 is a perspective view of a clamping slide of the shotgun stick head of FIG. 3.
Figure 26:
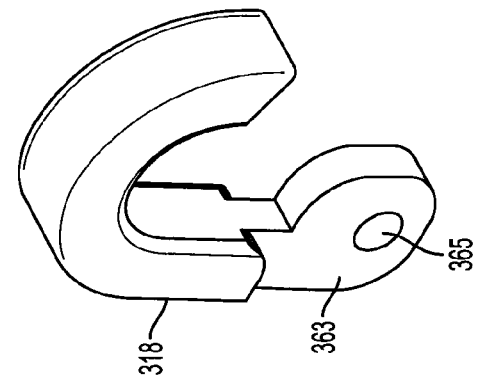
FIG. 26 is a perspective view of a clamping hook of the shotgun stick head of FIG. 3.

The hook 318 and the glide 364 of the clamping mechanism 360 are shown disassembled in FIGS. 26 and 27. The glide 364 has two shoulders 368 for accepting between them the end 363 of the hook 318. A pin 371 (FIG. 3) extends through a hole 365 of the end 318 and through the holes 369 of the shoulders 368 to hold the hook to pivot with respect to the glide 364. The glide 364 has a lead screw mount 366 with an aperture 367 for attaching to the lead screw 346.

Figure 25:
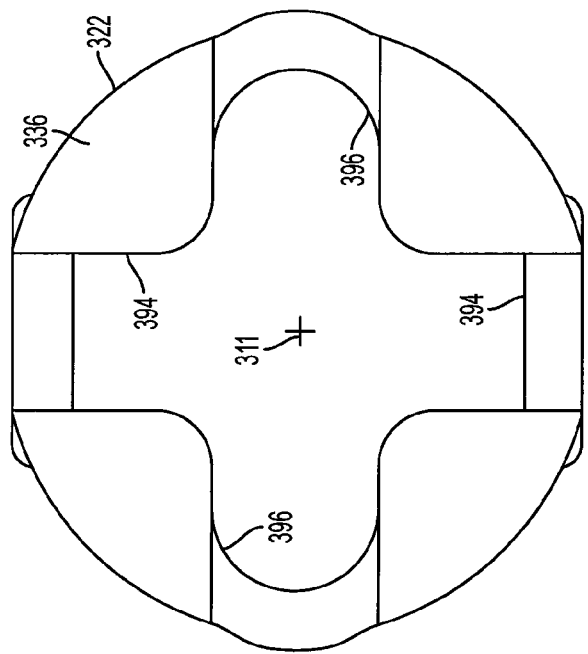
FIG. 25 is an end view of the head of FIG. 3.

FIG. 25 is an end view of the clamp housing 336 of the headstock 322 in the direction of the axis 311. The clamp housing 336 has two opposing glide wings 394 for accepting and guiding the slide 364 of the clamping mechanism 360 to move to extend from and retract into the headstock 322. The clamp housing 336 has two opposing actuator wings 396, either one for accepting the lead screw mount 366 and the lead screw 346. The hook 318 and glide 364 of the clamping mechanism 360 are shown in FIGS. 26 and 27.

Figure 5:
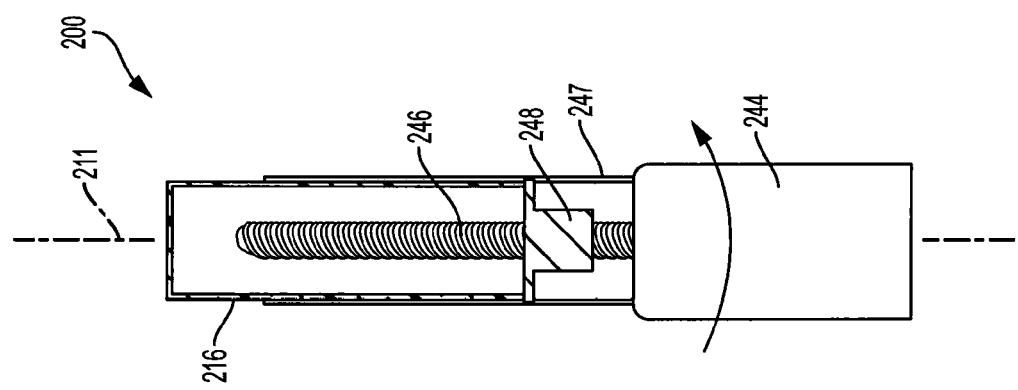
FIG. 5 is a schematic view of an actuating mechanism of a shotgun stick head, in accordance with embodiments described herein.
Figure 28:
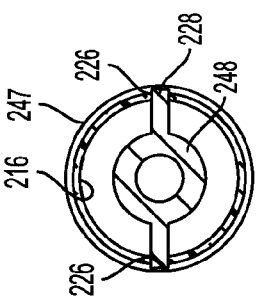
FIG. 28 is a bottom view of a portion of FIG. 5.

FIG. 5 is a schematic view of an actuating mechanism of a shotgun stick head 200, in accordance with embodiments described herein. The actuating mechanism includes a motor or electric motor 244 driving a threaded shaft 246. A threaded nut 248 is moved axially up and down the shaft in the direction of the axis 211, as the shaft turns in one direction or the other, respectively. The actuator includes telescoping inner tube 216 and outer tube 247. The nut 248 engages the bottom of the tube 216, which in turn directly or indirectly engages the clamping mechanism, to move the clamping mechanism to extend from and retract into the headstock. As shown, for example, in FIG. 28, the nut 248 includes opposing guides 226 that engage and slide along axially extending slots 228 formed in the wall of the outer tube 247 to restrain the turning of the nut 248 with respect to the tube 247.

Figure 6:
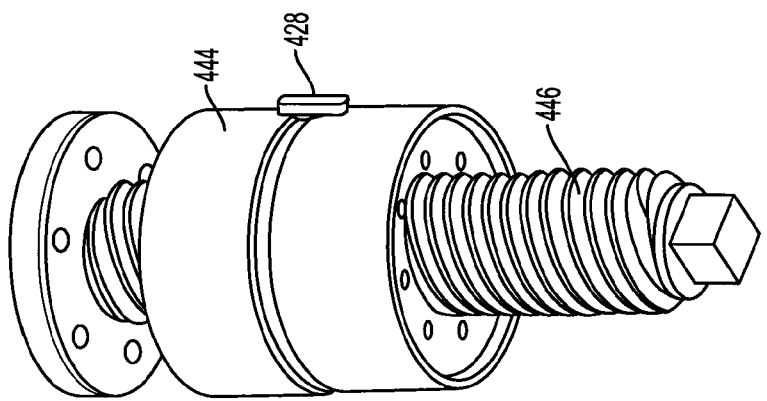
FIG. 6 is a perspective view of an actuator motor and lead screw of a shotgun stick head, in accordance with embodiments described.

FIG. 6 is a perspective view of an actuator motor 444 and the lead screw 446 of a shotgun stick head, in accordance with embodiments described. The motor 444 is mounted axially within the shotgun stick head and has an exterior stator and an interior rotor. The rotor has a threaded inner bore. The threaded lead screw 446 extends through the rotor inner bore. The rotor inner bore threads engage the lead screw 446 threads directly, or indirectly through intermediary gears, for example planetary gears, to move the lead screw axially upon rotation of the rotor. The lead screw 446 engages the clamping mechanism to slide it axially within the head 322. The motor 444 has at least one key protrusion 428 that engages a recess on the head to resist axial and rotational movement of the motor 444 with respect to the head. Further description of linear actuators may be found at the Web address http://en.wikipedia.org/wiki/Linear_actuator.

Figure 7:
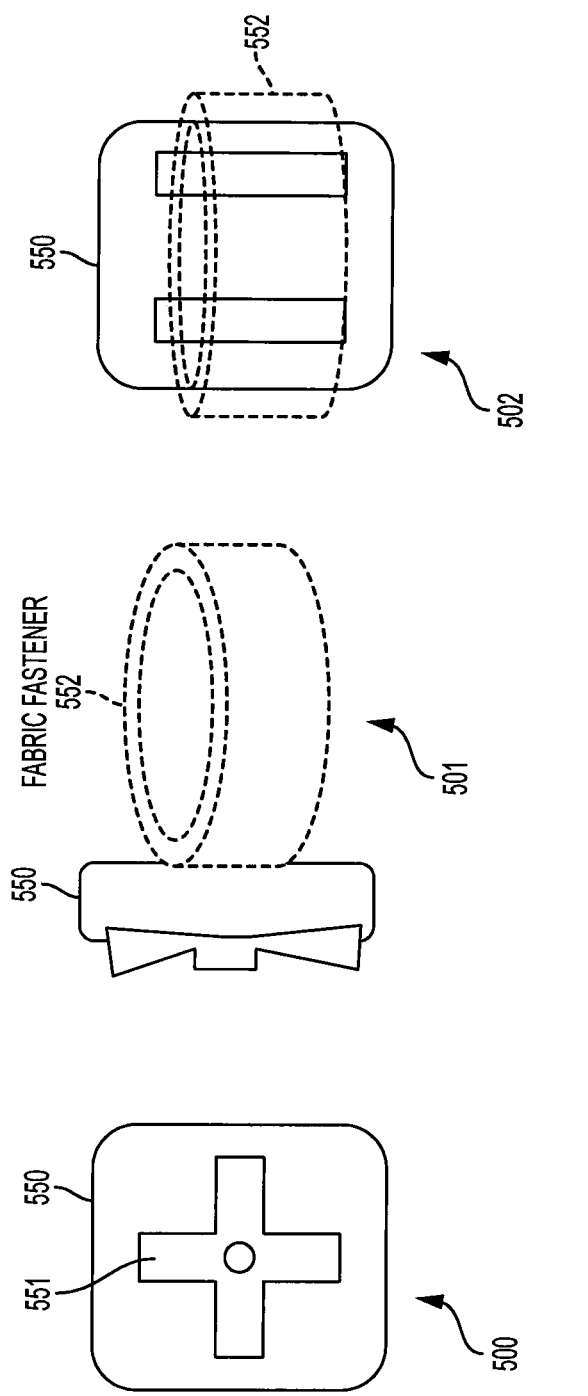
FIG. 7 is a schematic view of a remote control for a shotgun stick, in accordance with embodiments described herein.
Figure 8:
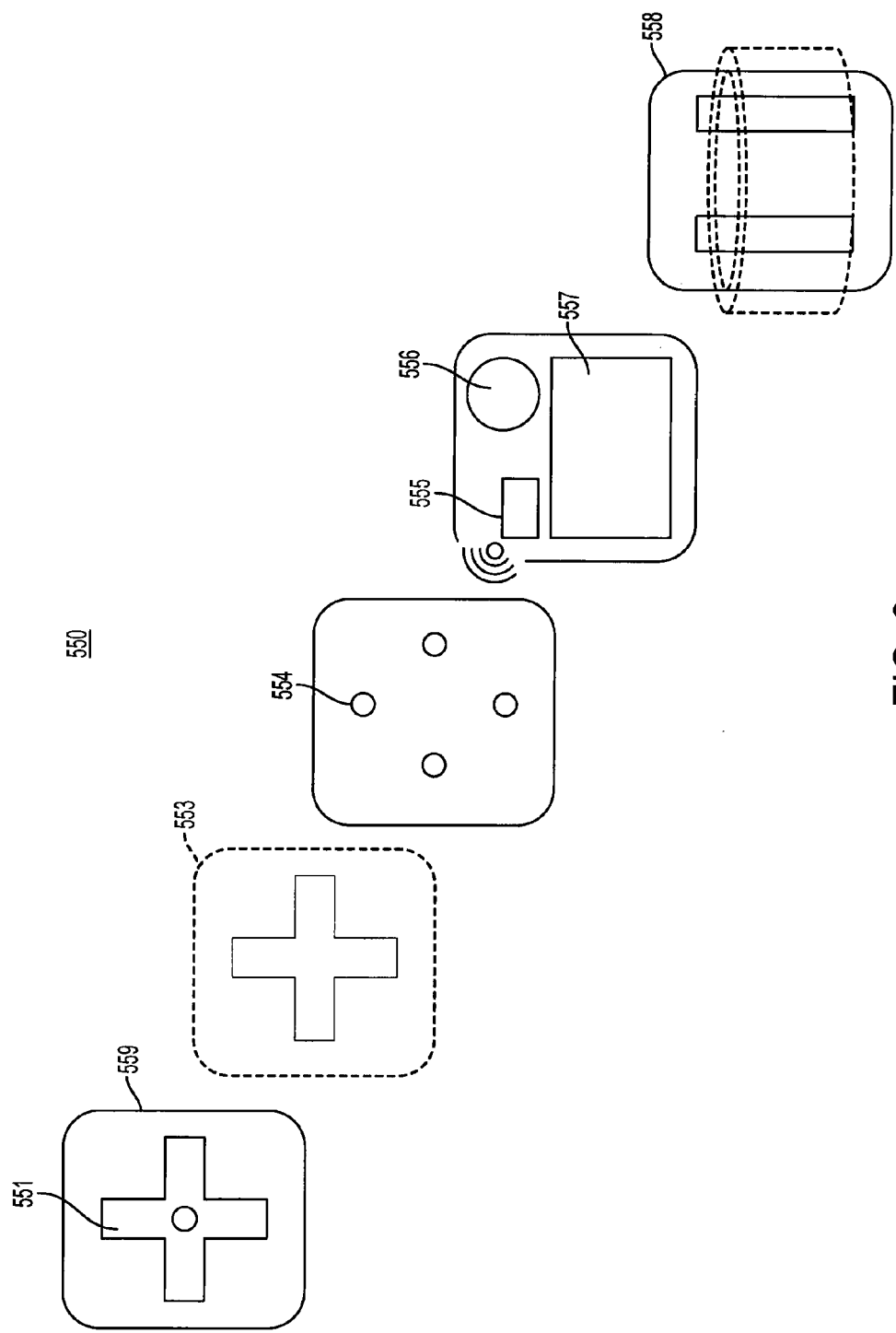
FIG. 8 is an exploded view of the components of the remote control of FIG. 7.

FIGS. 7 and 8 show details of a remote controller 550 that is operable by the operator to generate the control signal. For example, 500, 501 and 502 of FIG. 7 show top, side and bottom views, respectively. The remote controller includes a four way button control 551 operable by the operator for generating wireless signals: to selectively extend the clamping mechanism and to retract the clamping mechanism, to extend and retract the hook to stop in different positions, for example, the open position, the closed position, the clamped position which may be based on the dimensions of the clamp or other device the shotgun stick is manipulating, and the fully retracted position; and to selectively rotate the head clockwise and counter clockwise to position devices and to drive threaded devices, for example threaded eyes, to remove the device or to tighten the device preferably to a predetermined torque, or range of torque. The remote controller 550 includes sensors 554 for sensing depression of the button 551, a transmitter 555 for generating a control signal, and a control panel 557 including electronics for generating a signal to the transmitter in response to operation of the button 551, and a battery 556 for powering the transmitter and control panel. The remote controller 550 includes a top cover 559, a bottom cover 558, and a waterproof layer 553 to inhibit environmental moisture from reaching the battery, transmitter and control panel contained with the top cover 559 and bottom cover 558 when the controller 550 is assembled. The remote controller 550 includes a strap 552 attached to the bottom cover 558, which may be elastic and/or hook and loop material, for attaching the controller 550 to the support rod 13.

Figure 9:
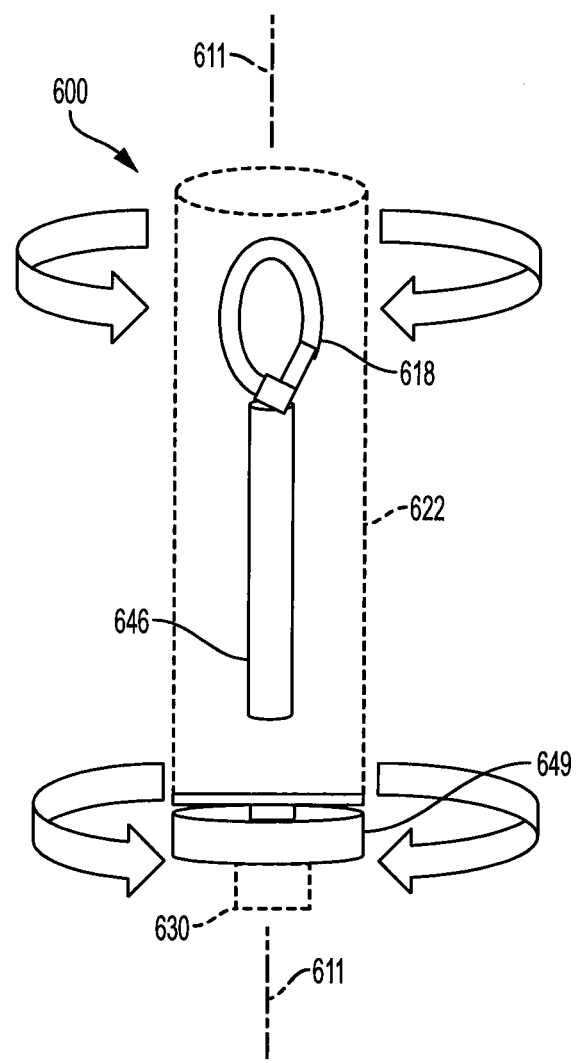
FIG. 9 is a schematic view of a shotgun stick head, in accordance with embodiments described herein.
Figure 10:
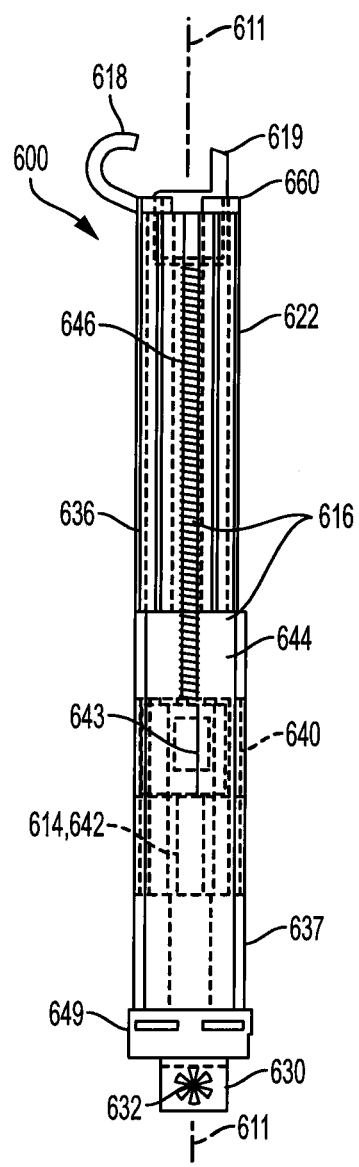
FIG. 10 is side view of the shotgun stick head of FIG. 9.

Refer now to FIGS. 9 and 10, there being shown a shotgun stick, generally designated by reference numeral 600, according to a described embodiment, for example showing a rotating headstock. The shotgun stick 600 includes an elongated, electrical insulating, support rod (not shown, but similar to the rod 13 of the stick 10). An electrical insulating head or headstock 622, including a head base 637 connected to a clamp housing 636, is mounted at the working end of the support rod. The rod and the mount 630 of headstock 622 have a universal attachment 632 connecting the headstock 622 to the rod, so the rod may be easily removed and changed, for example from a fixed length rod to an adjustable length rod.

A clamping mechanism 660 is mounted within the head 622 for extension from the head and retraction into the head. An actuating mechanism is mounted within the head 622 to move axially within the head along the direction of the axis 611 for extending and retracting the clamping mechanism 660. The actuating mechanism 616 engages the clamping mechanism 660 to push the clamping mechanism to slide it axially within the head for extension from the head, and to pull the clamping mechanism to slide it axially within the head for retraction into the head.

Comparable to known shotgun hooks, the clamping mechanism 660 includes a hook or pivoting hook 618 that is mounted to pivot to form an open hook with the clamping mechanism extended fully from the head at an open position, to pivot the end of hook 618 to the end of land 619 to form a closed loop with the clamping mechanism partially retracted into the head 622 at a closed position, and to clamp the device with the clamping mechanism partially retracted into the head 622 at a clamping position. In the open position, as shown, for example, by a battery powered shotgun stick with linear actuator and rotating headstock in FIG. 10, a device may be engaged or disengaged by the shotgun stick 610. In the closed position, the device may be turned by the shotgun stick 610, for example for tightening or loosening threaded fastening devices. In the clamping position, the device is grasped and may be carried and positioned by shotgun stick 610. FIG. 9 shows the clamping mechanism in the fully retracted position. For example, with retracted hook 618.

The actuating mechanism 616 includes a motor or actuator motor 644 mounted axially within the head 622 and having an exterior stator and an interior rotor, the rotor having a threaded inner bore. A threaded lead screw 646 extends through the rotor inner bore. The rotor inner bore threads engage the lead screw 646 threads to move the lead screw axially upon rotation of the rotor. The lead screw 646 engages the clamping mechanism 660 to slide it axially within the head 622.

The head 622 also includes a headstock rotating motor or rotation motor 649 for selectively rotating the head 622 around the axis 611 in the clockwise or counterclockwise directions. For example, with the clamping mechanism hook 619 in the closed position and engaging a threaded fastening device, the headstock rotating motor 649 may be operated to selectively rotating the head 622 in the clockwise or counterclockwise direction for tightening or loosening the threaded fastening device. The rotation of the head 622 by the motor 649 saves the lineman from manual rotation and reduces physical exertion. As an alternative, a dual-action actuator (not shown) may be used for (a) selectively rotating a lead screw fixed to a clamping mechanism in the clockwise or counterclockwise direction for tightening or loosening the threaded fastening device, and for (b) moving the lead screw axially to push the clamping mechanism to slide it axially within the head for extension from the head, and to pull the clamping mechanism to slide it axially within the head for retraction into the head. Example Dual-action actuators and further descriptions thereof are available as supplied by Haydon Kerk Motion Solutions of Waterbury, Conn. U.S.A. at the time of filing of this application.

A control module 614 is mounted within the head 622 for controlling the actuating mechanism 616 to extend and retract the clamping mechanism 660. The control module 614 housing includes a receiver 642 for receiving a control signal, and a battery or battery pack 640 for powering the control module 614, the actuator 616 motor 644, and the receiver 642. A battery indicator or battery level indicator 643 provides an indication of the remaining life of the battery 640. A remote controller (not shown) is operable by the operator to generate the control signal. The remote controller includes controls operable by the operator for generating wireless signals to selectively extend the clamping mechanism and to retract the clamping mechanism, and to selectively rotate the head clockwise and counter clockwise.

Figure 11:
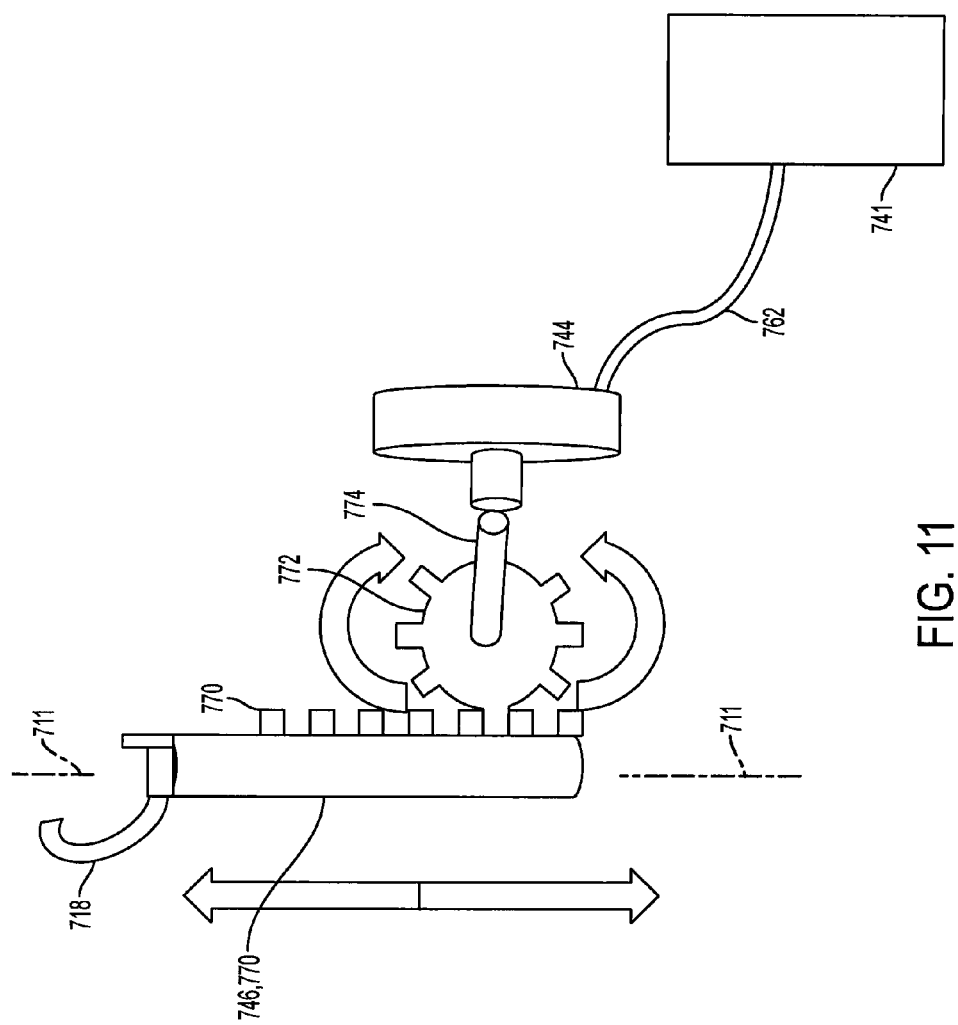
FIG. 11 is a schematic view of a shotgun stick head, in accordance with embodiments described herein.
Figure 12:
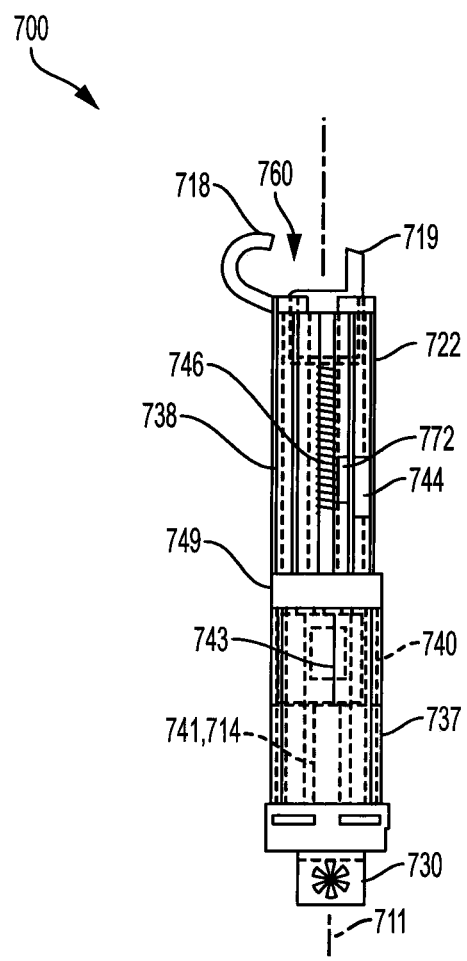
FIG. 12 is side view of the shotgun stick head of FIG. 11.

Refer now to FIGS. 11 and 12, there being shown a shotgun stick, for example a battery powered shotgun stick with flat motor and rotating headstock, generally designated by reference numeral 700, according to a described embodiment. The shotgun stick 700 includes an elongated, electrical insulating, support rod (not shown, but similar to the rod 13 of the stick 10).

An electrical insulating head, or headstock, 722 including a head base 737 connected to a clamp housing 738, is mounted at the working end of the support rod. The rod and the mount 730 of headstock 722 have a universal attachment 732 connecting the headstock 722 to the rod, so the rod may be easily removed and changed, for example from a fixed length rod to an adjustable length rod.

A clamping mechanism 760 is mounted within the head 722 for extension from the head and retraction into the head. An actuating mechanism is mounted within the head 722 to move axially within the head along the direction of the axis 711 for extending and retracting the clamping mechanism 760. The actuating mechanism 716 engages the clamping mechanism 760 to push the clamping mechanism to slide it axially within the head for extension from the head, and to pull the clamping mechanism to slide it axially within the head for retraction into the head.

Comparable to known shotgun hooks, the clamping mechanism 760 includes a pivoting hook or hook 718 that is mounted to pivot to form an open hook with the clamping mechanism extended fully from the head at an open position, to pivot the end of hook 718 to the end of a land 719 to form a closed loop with the clamping mechanism partially retracted into the head 722 at a closed position, and to clamp the device with the clamping mechanism partially retracted into the head 722 at a clamping position. In the open position a device may be engaged or disengaged by the shotgun stick 700. In the closed position, the device may be turned by the shotgun stick 700, for example for tightening or loosening threaded fastening devices. In the clamping position, the device is grasped and may be carried and positioned by shotgun stick 700.

The actuating mechanism 716 includes a motor or leadscrew motor 744 mounted within the head 722 and directly or indirectly, for example through a shaft 774, driving a gear or leadscrew gear 772. The teeth of the gear 772 engage the teeth 770 of a lead screw 746 to move the lead screw axially upon rotation of the rotor. The lead screw 746 with teeth 770 engages the clamping mechanism 760 to slide it axially within the head 722. In this configuration, the motor 744 may be mounted closer to the hook 718, allowing for a shorter lead screw, and reducing the size and weight of the headstock 722, which may make it easier to handle.

The head 722 also includes a headstock rotating motor 749 for selectively rotating the head 722 around the axis 711 in the clockwise or counterclockwise directions. For example, with the clamping mechanism hook 719 in the closed position and engaging a threaded fastening device, the headstock rotating motor 749 may be operated to selectively rotating the head 722 in the clockwise or counterclockwise direction for tightening or loosening the threaded fastening device. In the shotgun stick 700, the rotating motor 749 is located proximate to or between where the clamp housing 736 meets the head base 737, resulting in the rotation being limited to only the headstock clamp housing 736, so as to decrease the amount of stress on the motor 749 and/or the weight that the motor has to turn.

A control module 741 is mounted within the head 722 for controlling, via the wires 762 or by wireless signal, the actuating mechanism 716 to extend and retract the clamping mechanism 760. The control module 714 housing includes a receiver 742 for receiving a control signal, and a battery or battery pack 740 for powering the control module 714, the actuator 716, the motor 744, the motor 749, and the receiver 742. A battery level indicator 743 provides an indication of the remaining life of the battery 740. A remote controller (not shown) is operable by the operator to generate the control signal. The remote controller includes controls operable by the operator for generating wireless signals to selectively extend the clamping mechanism and to retract the clamping mechanism, and to selectively rotate the head clockwise and counter clockwise.

Figure 13:
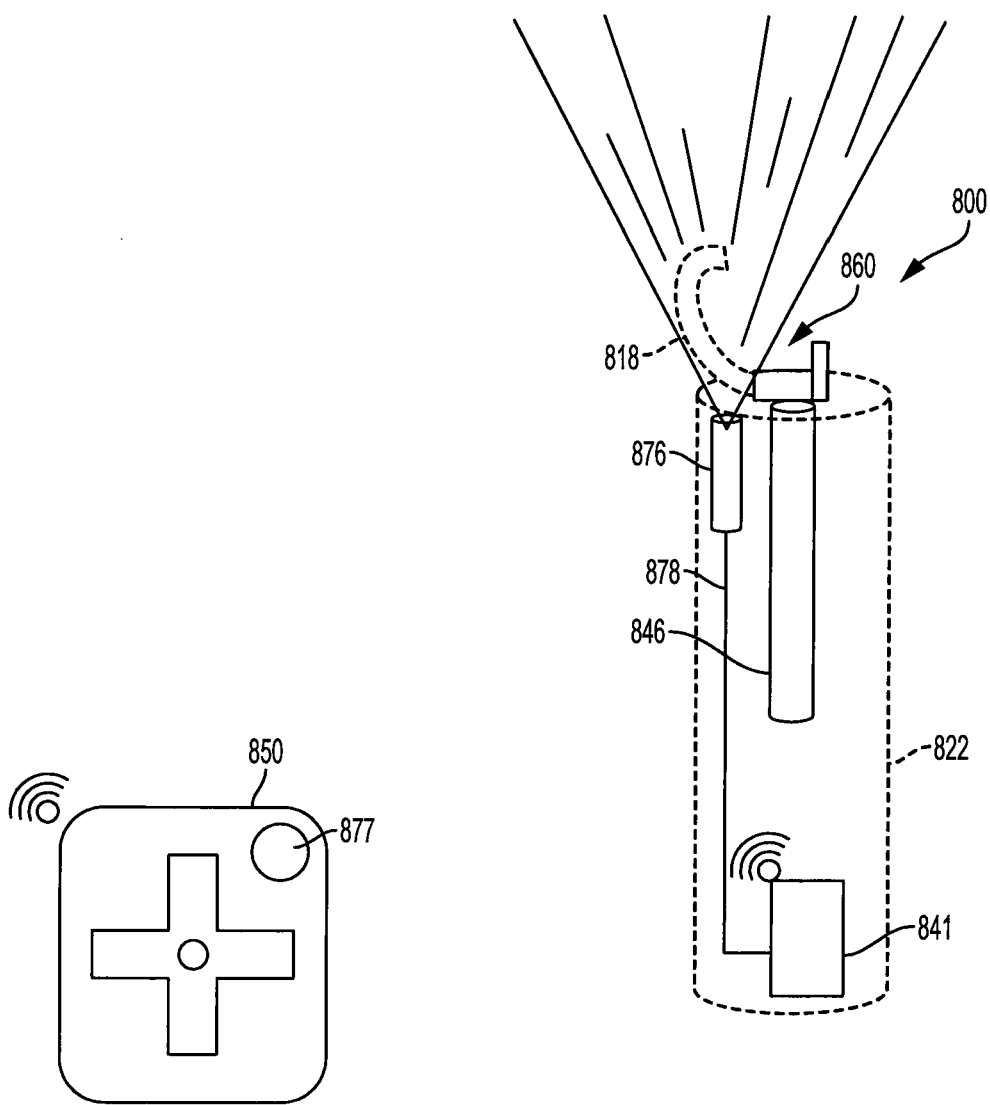
FIG. 13 is a schematic view of a shotgun stick, in accordance with embodiments described herein.
Figure 14:
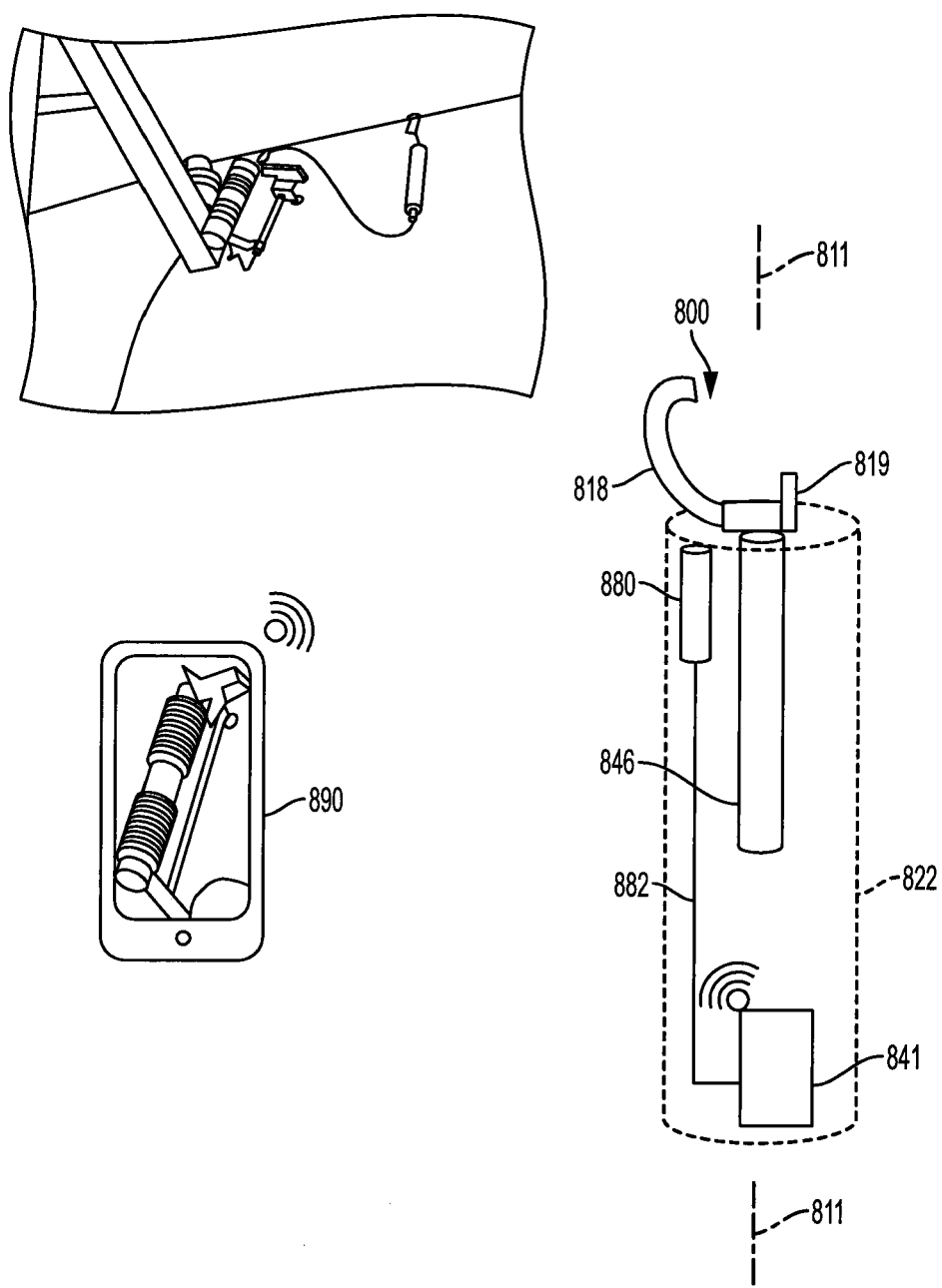
FIG. 14 is a schematic view of a shotgun stick, in accordance with embodiments described herein.
Figure 15:
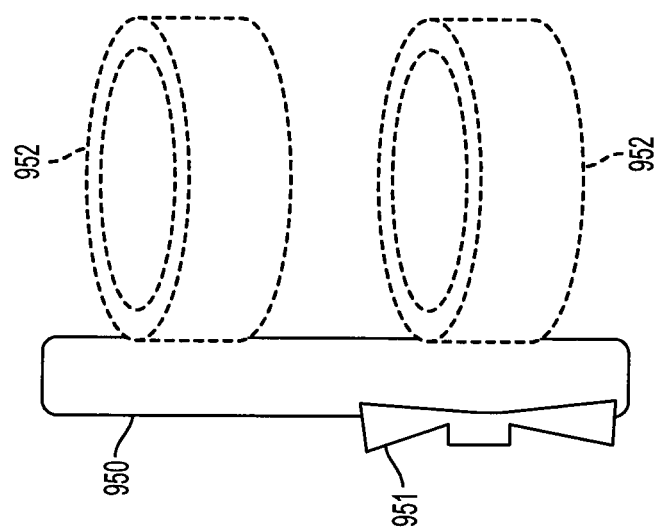
FIG. 15 is a schematic view of a remote control for a shotgun stick, in accordance with embodiments described herein.
Figure 15:
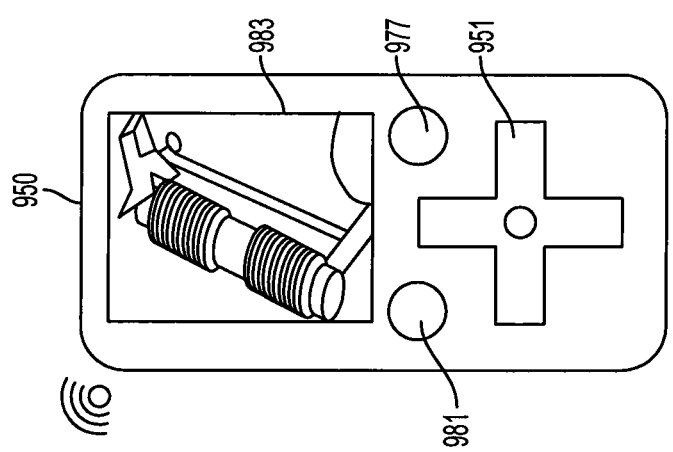
Figure 18:
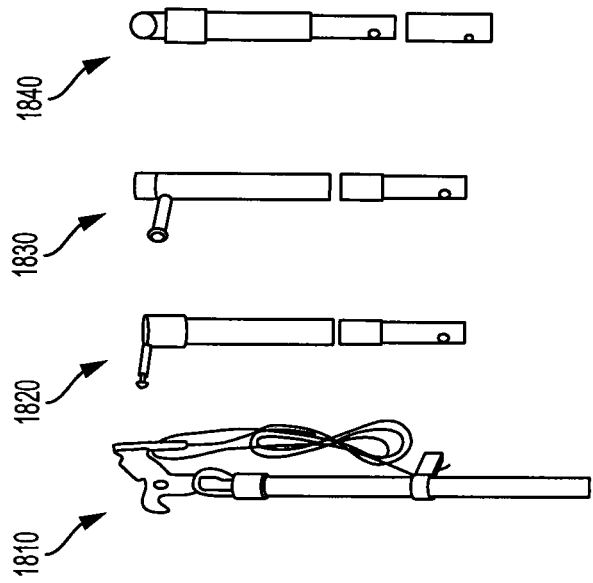
FIG. 18 is a view of prior art telescoping hot stick pole attachments.
Figure 17:
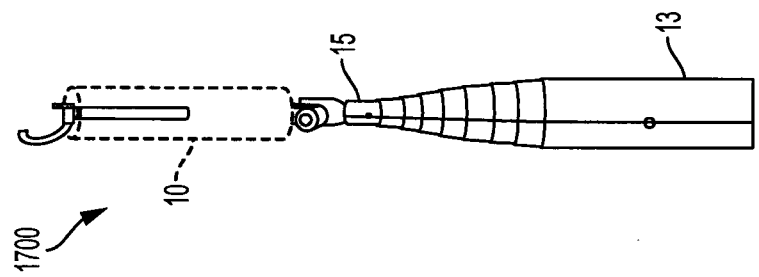
FIG. 17 is view of a shotgun stick, in accordance with embodiments described herein with a telescoping hot stick pole.
Figure 16:
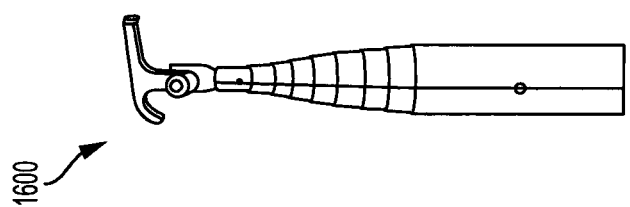
FIG. 16 is a view of a prior art telescoping hot stick pole.
Figure 19:
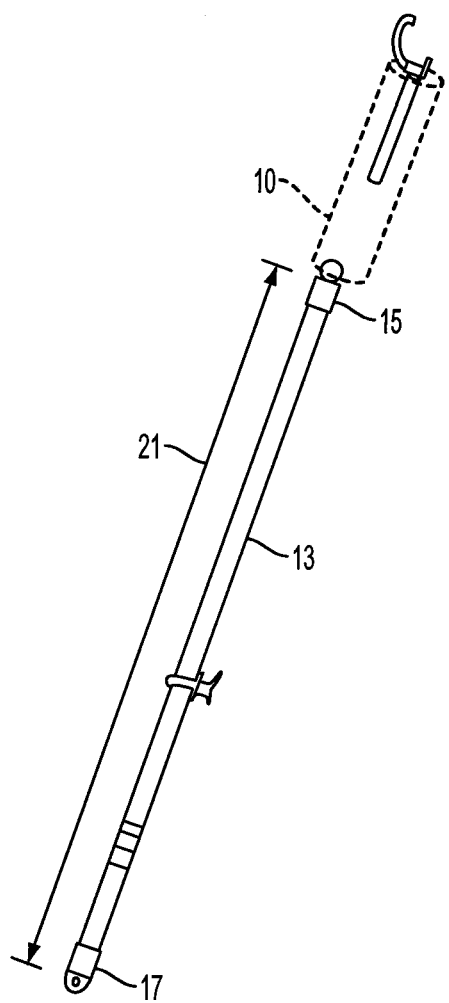
FIG. 19 is view of a shotgun stick, in accordance with embodiments described herein with a fixed-length hot stick pole.
Figure 21:
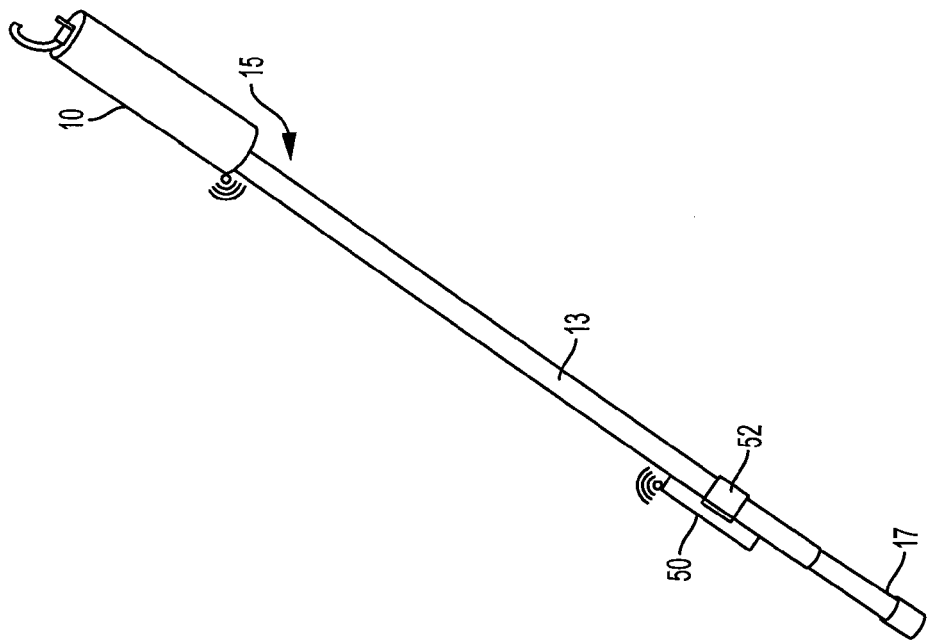
FIG. 21 is side view of a shotgun stick, in accordance with embodiments described herein.
Figure 20:
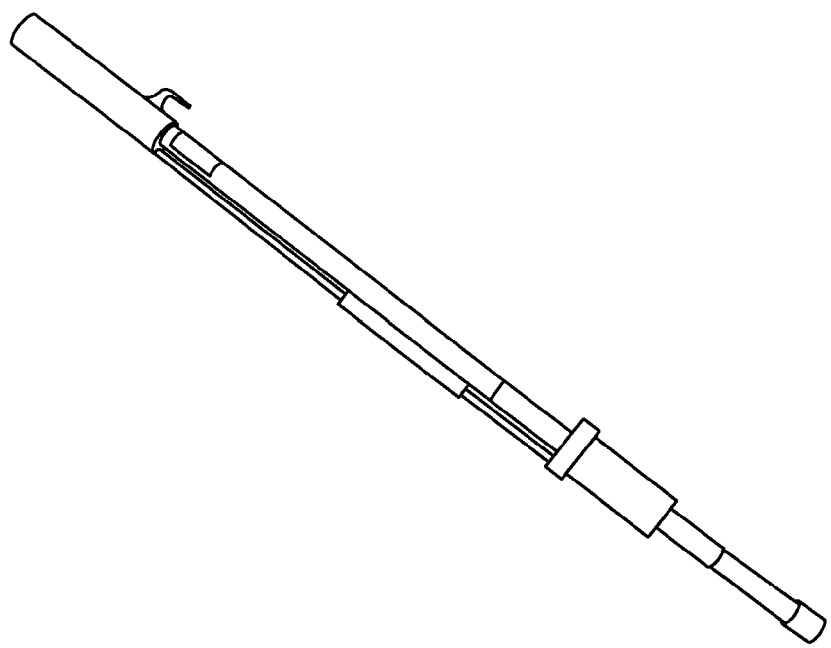
FIG. 20 is a view of a prior art shotgun stick.
Figure 23:
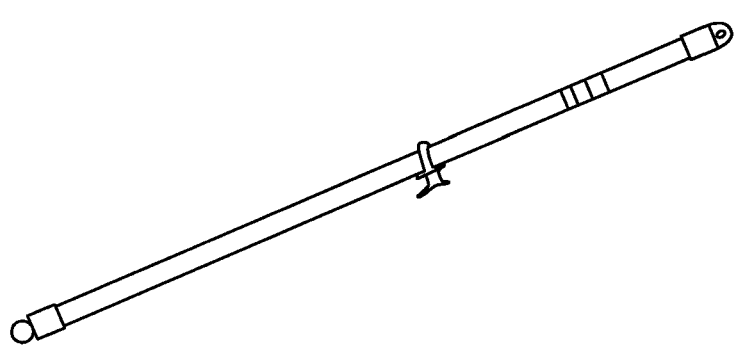
FIG. 23 is a view of a prior art fixed-length hot stick pole.

Refer now to FIGS. 13 through 15, there being shown a shotgun stick, generally designated by reference numeral 800, according to a described embodiment. The shotgun stick 800 includes an elongated, electrical insulating, support rod (not shown, but similar to the rod 13 of the stick 10).

A clamping mechanism 860 is mounted within the head or headstock 822 for extension from the head and retraction into the head. An actuating mechanism is mounted within the head to move axially within the head along the direction of the axis 811 for extending and retracting the clamping mechanism 860. The actuating mechanism, including for example leadscrew 846, engages the clamping mechanism 860 to push the clamping mechanism to slide it axially within the head for extension from the head, and to pull the clamping mechanism to slide it axially within the head for retraction into the head.

Comparable to known shotgun hooks, the clamping mechanism 860 includes a pivoting hook 818 that is mounted to pivot to form an open hook with the clamping mechanism extended fully from the head at an open position, to pivot the end of hook 818 to the end of a land 819 to form a closed loop with the clamping mechanism partially retracted into the head 822 at a closed position, and to clamp the device with the clamping mechanism partially retracted into the head 822 at a clamping position. In the open position a device may be engaged or disengaged by the shotgun stick 800. In the closed position, the device may be turned by the shotgun stick 800, for example for tightening or loosening threaded fastening devices. In the clamping position, the device is grasped and may be carried and positioned by shotgun stick 800.

A control module or control unit 841 is mounted within the head 822 for controlling the actuating mechanism to extend and retract the clamping mechanism 860. The head 822 also includes a light 876 mounted within the head for lighting in the direction of the clamping mechanism. The light 876 increases the visibility of the hook 818 and its surroundings in low light or no light conditions. The head 822 also includes a camera or video camera 880 mounted within the head for viewing in the direction of the clamping mechanism. The camera 880 increases the visibility of the hook 818 and its surroundings when operating the shotgun stick at great distances. The control module 841 includes a receiver for receiving a control signal, and a battery for powering the control module 841, actuating mechanism, the light 876, the camera 880, and the receiver. The control module is connected to the light via the wire 878, and is connected to the camera via the wire or optical fiber 882. The control module 841 is configured to send a signal of the camera image to a display, for example the mobile device 890. The mobile device 890 may be configured to perform the functions of the remote controllers described herein.

A remote controller 850 is operable by the operator to generate the control signal. The remote controller includes controls operable by the operator for generating wireless signals: to selectively rotate the head clockwise and counter clockwise to position devices and to drive threaded devices, for example threaded eyes, to remove the device or to tighten the device preferably to a predetermined torque, or range of torque; to selectively extend the clamping mechanism and to retract the clamping mechanism, to extend and retract the hook to stop in different positions, for example, the open position, the closed position, the clamped position which may be based on the dimensions of the clamp or other device the shotgun stick is manipulating, and the fully retracted position; and including button 877 to selectively operate the light 876, for example to click to turn the light on and off.

A remote controller 950 is operable by the operator to generate the control signal, for example a four function wireless controller with light button and video screen. The remote controller includes controls operable by the operator for generating wireless signals: to selectively rotate the head clockwise and counter clockwise to position devices and to drive threaded devices, for example threaded eyes, to remove the device or to tighten the device preferably to a predetermined torque, or range of torque; to selectively extend the clamping mechanism and to retract the clamping mechanism, to extend and retract the hook to stop in different positions, for example, the open position, the closed position, the clamped position which may be based on the dimensions of the clamp or other device the shotgun stick is manipulating, and the fully retracted position, and including button 977 to selectively operate the light 876, and button 981 to selectively operate the camera 880, for example the button may turn the video camera on and off. The controller 950 also includes a display or video screen 983 for displaying the image from the camera 880 and a fabric fastener 952.

Figure 22:
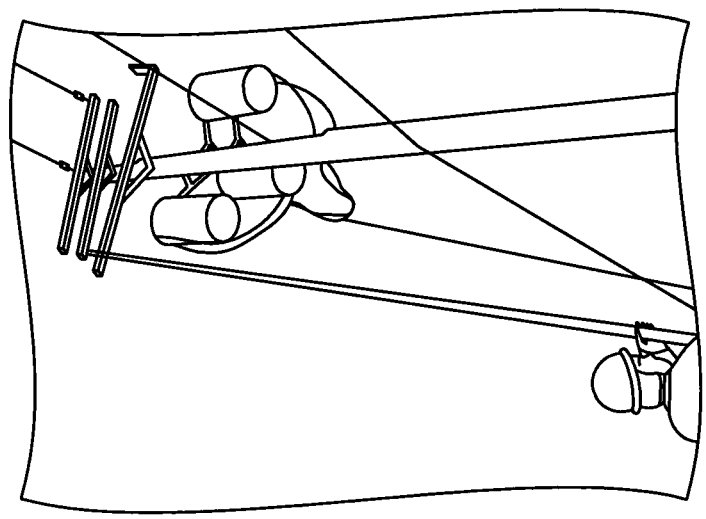
FIG. 22 is a view of a telescoping hot stick pole in use.
Figure 24:
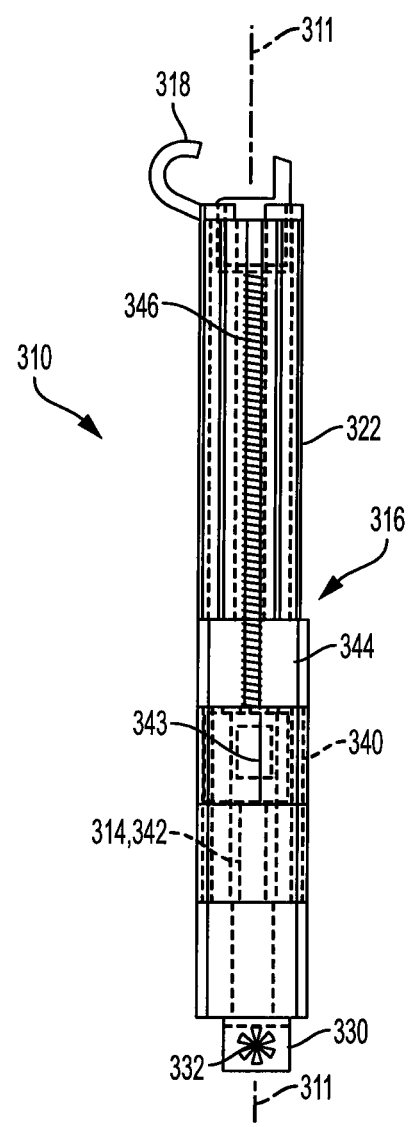
FIG. 24 is a side view of the head of FIG. 3.

FIG. 22 shows a shotgun stick according to a described embodiment in use by a lineman. For example, an extended telescoping pole in use.

While the foregoing has described in detail preferred embodiments known at the time, it should be readily understood that the invention is not limited to the described embodiments. Rather, the invention can be modified to incorporate any number of variations, alterations, substitutions or equivalent arrangements not heretofore described, but which are commensurate with the spirit and scope of the invention. For example, while the described embodiments may have been shown as an attachment to a telescoping pole or hot stick, each embodiment could be incorporated into a standalone shotgun stick. Accordingly, the invention is not to be seen as limited by the foregoing description.

What is claimed as new and desired to be protected by Letters Patent of the United States is:

1. A shotgun stick for use by an operator to manipulate, remove and install clamps and other devices to electrical connectors on electric power distribution systems, comprising:
    an elongated, electrical insulating, support rod having a working end and a holding end, and having a length between the working end and the holding end;
    an electrical insulating head mounted on the working end of the support rod, wherein the head includes at least one wall defining a cavity internal to the head and the cavity intersects a center longitudinal axis of the head;
    a clamping mechanism mounted within the cavity for extension from the cavity and retraction into the cavity;
    an actuating mechanism mounted within the cavity for extending and retracting the clamping mechanism, wherein the actuating mechanism is adapted to engage the clamping mechanism to slide the clamping mechanism axially within the cavity;
    a control module mounted within the cavity for controlling the actuating mechanism to extend and retract the clamping mechanism, the control module including a receiver for receiving a control signal; and
    a remote controller, operable by the operator holding the holding end to generate the control signal.

2. A shotgun stick as in claim 1, wherein the clamping mechanism is mounted to slide axially within the cavity for extension from the head and retraction into the head.

3. A shotgun stick as in claim 2, wherein the actuating mechanism engages the clamping mechanism to push the clamping mechanism to slide it axially within the cavity for extension from the head, and to pull the clamping mechanism to slide it axially within the cavity for retraction into the head.

4. A shotgun stick as in claim 3, wherein the actuating mechanism includes a motor mounted axially within the cavity and having an exterior stator and an interior rotor, the rotor having a threaded inner bore, and a threaded lead screw extending through the rotor inner bore, the rotor inner bore threads directly or indirectly engaging the lead screw threads to move the lead screw axially upon rotation of the rotor, the lead screw engaging the clamping mechanism to slide it axially within the cavity.

5. A shotgun stick as in claim 4, further including a battery mounted within the cavity, the battery powering the motor and the control module.

6. A shotgun stick as in claim 2, wherein the clamping mechanism is mounted to slide axially within the cavity along a longitudinal axis of the head.

7. A shotgun stick as in claim 1, wherein the control signal is wireless.

8. A shotgun stick as in claim 7, wherein the control signal is a radio frequency wave.

9. A shotgun stick as in claim 7, wherein the control signal is a visual frequency wave.

10. A shotgun stick as in claim 7, wherein the control signal is acoustic.

11. A shotgun stick as in claim 1, further including a rotation mechanism for rotating the head with respect to the support rod.

12. A shotgun stick as in claim 11, wherein the remote controller includes controls operable by the operator for generating signals to selectively rotate the head clockwise and counter clockwise.

13. A shotgun stick as in claim 1, wherein the actuating mechanism includes a motor mounted within the cavity, the motor driving a gear, the gear directly or indirectly engaging a toothed lead screw to move the lead screw axially upon operation of the rotor, the lead screw engaging the clamping mechanism to slide it axially within the cavity.

14. A shotgun stick as in claim 1, further including a camera mounted within the cavity for viewing in the direction of the clamping mechanism.

15. A shotgun stick as in claim 14, wherein the remote controller includes controls operable by the operator for selectively operating the camera.

16. A shotgun stick as in claim 15, wherein the remote controller includes a screen for viewing an image generated by the camera.

17. A shotgun stick as in claim 16, wherein the remote controller includes a smart phone.

18. A shotgun stick as in claim 1, wherein the clamping mechanism includes a pivoting hook that is mounted to pivot to form an open hook with the clamping mechanism extended fully from the head at an open position, to form a closed loop with the clamping mechanism partially retracted into the head at a closed position, and to clamping the device with the clamping mechanism partially retracted into the head at a clamping position.

19. A shotgun stick as in claim 1, wherein the remote controller includes controls operable by the operator for generating signals to selectively extend the clamping mechanism and to retract the clamping mechanism.

20. A shotgun stick as in claim 1, further including a light mounted within the cavity for lighting in the direction of the clamping mechanism.

21. A shotgun stick as in claim 20, wherein the remote controller includes controls operable by the operator for selectively operating the light.

22. A shotgun stick as in claim 1, wherein the support rod length is fixed.

23. A shotgun stick as in claim 1, wherein the support rod length is adjustable.

24. A shotgun stick as in claim 1, wherein the remote controller includes a strap for attaching to the support rod.

25. The shotgun stick as in claim 1, wherein the clamping mechanism includes at least one pivotally connected hook.

26. A method of manipulating, removing and installing clamps and other devices to electrical connectors on electric power distribution systems, comprising the steps of:

providing a shotgun stick for use by an operator, including: an elongated, electrical insulating, support rod having a working end and a holding end, and having a length between the working end and the holding end; an electrical insulating head mounted on the working end of the support rod, wherein the head includes at least one wall defining a cavity internal to the head and the cavity intersects a center longitudinal axis of the head; a clamping mechanism mounted within the cavity for extension from the cavity and retraction into the cavity; an actuating mechanism mounted within the cavity for extending and retracting the clamping mechanism, wherein the actuating mechanism is adapted to engage the clamping mechanism to slide the clamping mechanism axially within the cavity; a control module mounted within the cavity for controlling the actuating mechanism to extend and retract the clamping mechanism, the control module including a receiver for receiving a control signal; and a remote controller, operable by the operator holding the holding end to generate the control signal;

operating the remote controller to extend the clamping mechanism;

engaging the device with the clamping mechanism;

operating the remote controller to retract and close the clamping mechanism on the device; and manipulating the engaged device.

\* \* \* \* \*